Figure 1:
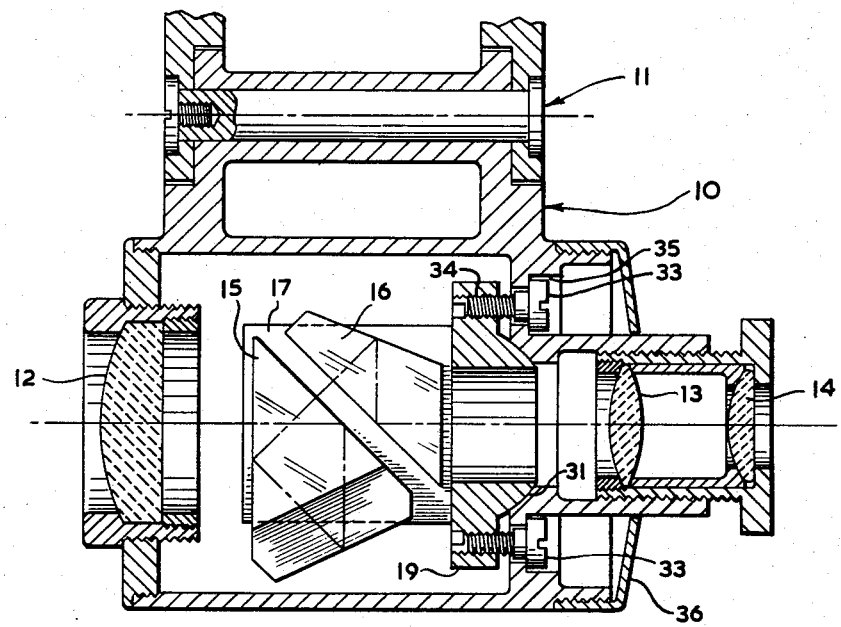

Aug. 21, 1962 T. MALINOWSKI 3,049,972
BINOCULAR WITH IMPROVED SYSTEM OF OPTICAL ADJUSTMENT
Filed April 19, 1961

INVENTOR
TADEUSZ MALINOWSKI

BY Featherstonhaugh & Co.
ATTORNEYS

3,049,972
BINOCULAR WITH IMPROVED SYSTEM OF OPTICAL ADJUSTMENT
Tadeusz Malinowski, Midland, Ontario, Canada, assignor to Ernest Leitz Canada Limited, Midland, Ontario, Canada
Filed Apr. 19, 1961, Ser. No. 104,133
3 Claims. (Cl. 88—33)

This invention relates to optical devices and in particular, to a binocular construction having an improved system of optical adjustment.

The conventional binocular is composed of two telescopic systems connected by a mechanical hinge whereby the distance between the optical axes of the two telescopes may be adjusted as to match the distance between the eyes of the user.

To obtain a proper optical adjustment of a pair of binoculars, it is important that the final image given by each telescope is properly oriented with respect to the object. Thus, a telescope that has been properly adjusted must give a vertical image of a vertical object. In conventional binocular constructions, this optical adjustment is made by arranging the set of erecting prisms in the proper optically-checked positions after the prisms have been placed within the body of each telescope. The prisms are then clamped or otherwise fixed in these positions. The disadvantage of this method is that the adjustment is difficult due to the poor accessibility of the prisms.

Another step in the optical adjustment of binoculars is to set the optical axes of the two telescopes parallel to each other. This adjustment amounts to setting the optical axes of both telescopes parallel to the axis of the mechanical hinge. In conventional binoculars, this parallelism is achieved by adjusting the objective lenses of each telescope with respect to the bodies of the telescopes by means of two eccentric mounts.

A characteristic feature of the binocular construction in accord with this invention is that the set of erecting prisms is mounted on a separate mounting unit of particular design and having means for adjusting the prisms for verticality of image. This adjustment can thus be done before the prisms with their mounts are placed inside the bodies of the telescopes, which makes this operation relatively simple compared with the same adjustment in conventional binocular constructions. Furthermore, the ease with which the prism systems can be removed from the bodies of the telescopes greatly simplifies their cleaning.

Another important feature of this arrangement is that after the prism systems have been introduced into the bodies of the telescopes, their optical axes can be adjusted for parallelism by a slight rotation of the systems by means of easily accessible adjusting screws. In comparison with conventional binocular constructions, this last adjustment is less expensive and easier to carry out.

Figure 2:
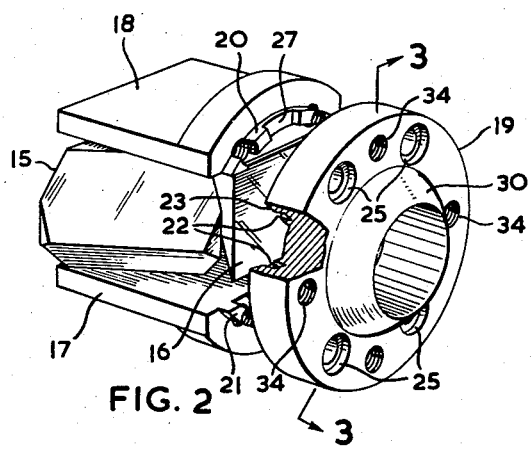
Figure 3:
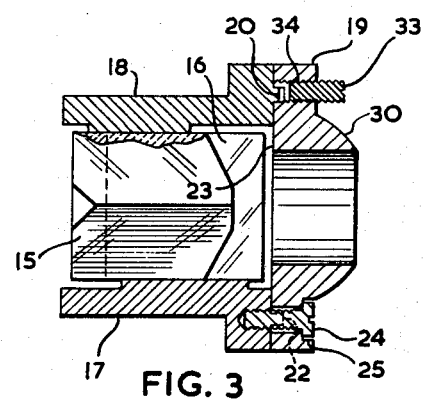

In the drawings:

FIGURE 1 is an axial cross-section of the binocular construction in accord with this invention, FIGURE 2 is a perspective view of the prism mounting unit incorporated in the binocular construction illustrated in FIGURE 1, and FIGURE 3 is a cross section taken along lines 3—3 in FIGURE 2.

In FIGURE 1, 10 generally indicates the body of one of the telescopes incorporated in the binocular construction in accord with this invention. It will be understood that the other telescope is a duplicate of the one illustrated. They are connected together by means of a mechanical hinge 11. Telescope body 10 carries an objective lens 12 and eyepiece lenses 13 and 14. All of these lenses may be of any conventional type. The erecting system composed of the two prisms, 15 and 16, may also be of any conventional type, the present invention primarily relating to the manner in which the prisms are mounted within the telescope body 10 as to provide novel means for optically adjusting the prisms. In the illustrated embodiment of the invention, prism 15 has three reflecting faces, one of which is roof-shaped and the other prism 16 has two reflecting faces.

As is best seen in FIGURE 2, prism 15 is bonded to a lower mounting plate 17 while prism 16 is bonded to an upper mounting plate 18. Both mounting plates are fixed in turn to a common ring-shaped base plate 19 in such manner that their bonding faces are approximately parallel to each other. Both mounting plates 17 and 18 are provided with arc-shaped protruding collars 20 and 21 which fit into a circular groove 22 on the adjacent face 23 of base plate 19. The protruding collars 20 and 21 are free to slide within groove 22 so that the relative positioning of the two mounting plates 17 and 18 may be changed while, at the same time, maintaining constant their distances from the optical axis of the prism mounting unit. Each of the mounting plates 17 and 18 are fixed to the base plate 19 by two screws 24. To move the mounting plates 17 and 18 relative to each other and to the base plate 19, screws 24 must be loosened. It will be noted that the heads of screws 24 are of somewhat smaller diameter than their accommodating recesses 25 whereby to allow for the movement of plates 17 and 18.

On its side opposite the prism mounting plates 17 and 18, base plate 19 is provided with a protruding collar 30. Collar 30 is shaped as to have a convex spherical outer surface. This surface fits into a concave spherical recess 31 formed on the internal side of the eyepiece side wall of the telescope member 10. It will be appreciated, of course, that a separate eyepiece sub-assembly could be used. The base plate 19 is held within the telescope body by means of four screws 33 which engage the threaded holes 34 in the base plate. It will be noted that the heads of screws 33 are allowed some play in their accommodating recesses 25. This play permits a modest deviation between the longitudinal axes of screws 33 and the longitudinal axes of the recesses 35. Thus, should it be necessary to adjust the optical axis of the prism assembly with respect to the longitudinal axis of the telescope body, the adjustment can be made by shifting collar 30 within itis recess 31 by appropriate manipulation of the four screws 33. It should be noted that since, in some cases, the screws 33 will protrude from the face of base plate 19 in the region of the grooves 22, the collars 20 can be recessed as at 27 to avoid interference between the collars and screws 33.

The optical adjustment of the binocular in accord with this invention is accomplished in two separate steps. The first step consists of adjusting the prism assembly for verticality of image before the prism assembly is placed within the telescope body 10. This adjustment is done by loosening the four screws 24, shifting the two prism mounting plates 17 and 18 until a correct verticality of image is obtained and retightening the screws 24. The properly adjusted prism assembly is then placed in the telescope body 10 as are the objective and eyepiece lens assemblies. With the cap 36 removed, the prism assembly is then adjusted by means of screws 33 whereby to orient the optical axis of the prism assembly parallel with the optical axis of the telescope and, at the same time, parallel with the hinge line 11. Cap 36 is then replaced and the binocular ready for use.

What I claim as my invention is:

1. A binocular construction comprising a pair of hingedly connected telescope members, each of said telescope members including a system of erecting prisms, a separate mounting plate for each of said prisms, a base plate, at least one screw member protruding through said base plate to engage in threaded apertures in each of said mounting plates, said base plate having an annular groove in its face adjacent said mounting plates, and said mounting plates having arc-shaped protruding collars shaped to slidingly engage in said groove, whereby said mounting plates may be shifted, when said screws are loose, as to change the relative positioning of said prisms whereby to optically adjust said prisms so that they produce a correctly oriented image.

2. A binocular construction as claimed in claim 1 in which the other face of said base plate is provided with a protruding collar having an outer surface of spherical configuration, each of said telescope members including a spherical recess for accommodating said spherical surface.

3. A binocular construction as claimed in claim 1, in which each of said telescope members includes two pairs of adjusting screws interconnecting said telescope members and said base plate, the heads of said adjusting screws being loosely accommodated in recesses in said telescope member whereby said base plate, mounting plates and prisms may be moved as a unit by appropriate manipulation of said adjusting screws to orient said unit with respect to the longitudinal axis of said telescope member and hence with respect to said mechanical hinge.

No references cited.